United States Patent [19]

Herrigel

[11] 4,207,183
[45] Jun. 10, 1980

[54] PREVENTION OF SOLUTE DEPOSITION FOULING IN MEMBRANE PROCESSES

[75] Inventor: Howard R. Herrigel, Seattle, Wash.

[73] Assignee: Resources Conservation Company, Renton, Wash.

[21] Appl. No.: 904,981

[22] Filed: May 11, 1978

[51] Int. Cl.² ............................................. B01D 13/02
[52] U.S. Cl. .................................. 210/23 H; 210/409; 210/433 M; 210/195.2; 204/180 P; 204/301
[58] Field of Search ........... 210/353, 23 H, 79, 321 R, 210/433 M, 409, 500 M, 75, 193, 46, 59, 195.2; 204/180 P, 301

[56] References Cited

U.S. PATENT DOCUMENTS

| 3,425,562 | 2/1969 | Hamer | 210/353 |
| 3,541,006 | 11/1970 | Bixler et al. | 210/353 |
| 3,552,574 | 1/1971 | Lowe et al. | 210/353 |
| 3,700,591 | 10/1972 | Higley | 210/23 H |
| 3,778,366 | 12/1973 | Kraus | 210/353 |
| 3,996,131 | 12/1976 | Conn | 210/23 H |

FOREIGN PATENT DOCUMENTS

| 2217273 | 10/1974 | France | 210/46 |
| 50-60470 | 5/1975 | Japan | 210/46 |
| 51-17185 | 2/1976 | Japan | 210/23 H |

Primary Examiner—Benoit Castel
Attorney, Agent, or Firm—Bacon & Thomas

[57] ABSTRACT

A method for preventing fouling in apparatus used to separate a solvent from a solute which includes a semipermeable membrane barrier is disclosed. The method comprises providing a quantity of nucleation crystals in the fluid stream passing through the separation apparatus which causes preferential precipitation of the solute thereby eliminating the formation of deposits on the membrane barrier. An apparatus for carrying out the process of the invention is also disclosed.

18 Claims, 6 Drawing Figures

PREVENTION OF SOLUTE DEPOSITION FOULING IN MEMBRANE PROCESSES

TECHNICAL FIELD OF THE INVENTION

The present invention is directed to a method for preventing fouling in liquid separation apparatus which contains semi-permeable membrane barriers.

BACKGROUND OF THE PRIOR ART

The use of semi-permeable membrane barriers in apparatus designed to accomplish liquid phase separation of a solvent from a solute is well known to those of skill in the art. Typical of such apparatus are those used in reverse osmosis, electro-dialysis, ultrafiltration, and similar processes. Unfortunately, in industrial applications of these processes, there is a tendency of the less soluble components in the solution to precipitate on the membrane barriers as the solution is concentrated. The precipitation of certain solutes, such as calcium sulfate and silica, is particularly deleterious since they form hard deposits on the membrane barriers which are extremely difficult, and sometimes impossible, to remove. The deposits which form on the membrane barriers in this manner greatly inhibit passage of solvents through the apparatus and, accordingly, decreases the overall efficiency of the separation unit.

Heretofore, numerous means have been proposed to reduce the problem of fouling in membrane-containing separation apparatus. For example, U.S. Pat. No. 3,552,574 discusses the problem of fouling of membranes in a reverse osmosis system and purports to solve the problem by providing a plurality of scouring elements, including free spheres made of glass, ceramics, stainless steel, noble metal, hard rubber, or plastics in the space adjacent the face of the semi-permeable membrane barrier. The spheres are agitated by the liquid which circulates across the membrane causing the spheres to oscillate within the space adjacent the membrane, thereby cleaning the membrane surface. Similarly, in U.S. Pat. No. 3,541,006, particulate glass and elastomeric beads are introduced into the upstream side of an ultrafiltration membrane unit to dislodge retained solute material from the membrane surface. Other proposed methods utilize sequesterants in the liquid medium to keep the membrane free from salt deposits. See, e.g., U.S. Pat. Nos. 3,394,068 and 4,046,686. Still other methods, such as that disclosed in U.S. Pat. No. 4,036,749, attempt to eliminate fouling by pre-treating the liquid medium prior to introduction into the membrane-containing unit, to remove ions which can form deposits in the unit.

While these methods for reducing fouling in membrane-containing separation units have been mildly successful in industrial applications, there remains a need for improved methods of maintaining such separation units clean and deposit-free.

SUMMARY OF THE INVENTION

Accordingly, the present invention is directed to an improved method for preventing the formation of deposits caused by precipitating solutes upon membrane barriers in liquid phase separation units. The method comprises providing an effective amount of small nucleation crystals in the fluid stream passing through the separation unit. By judicious selection of the amount and size of the nucleation crystals, based upon the rate of precipitation of the slightly soluble solute components, the rate of separation of the solvent, and the volume of equipment, the precipitation of the slightly soluble solutes will occur upon the nucleation crystals rather than the membrane barrier. The nucleation crystals containing precipitated solute may then be separated from the units and returned to the circulating fluid by various means. The returning crystals are preferably comminuted to reduce the crystal size to the proper range for optimum nucleation effect.

The present invention is also directed to an apparatus for separating a solvent from a solute by means of a semi-permeable membrane barrier which substantially eliminates the problem of fouling resulting from the build-up of solute deposits on the barrier. The apparatus comprises inlet means for admitting the liquid feed, separation means which includes a semi-permeable membrane barrier, outlet means on both the upstream and downstream sides of the membrane barrier for removing the concentrated solute and purified solvent from said separation means, and means for introducing an amount of nucleation crystals into said liquid feed which retard the formation of deposits on the semi-permeable membrane barrier. The apparatus may, optionally, contain means for separating the nucleation crystals from the concentrated solute which is removed from the separation means. This allows the crystals to be recycled to the feed stream for continued use in the system. Means for comminuting the crystals may be provided at this point.

The method and apparatus of the present invention, thus, provides an efficient means for separating a solvent from a solute while simultaneously controlling the precipitation of solutes in the liquid medium so as to prevent the build-up of deposits on the membrane barrier. Moreover, by employing nucleation crystals to preferentially precipitate deposit-forming solutes in the feed, the method and apparatus of the present invention are adapted for use with liquids containing extremely high solute concentrations without the need for pre-treatments or inclusion of membrane clogging foreign bodies, as required by the methods and apparatus of the prior art.

BRIEF DESCRIPTION OF THE DRAWINGS

The figures of drawing illustrates various specific modes of operation of liquid phase separation units using the deposit-preventing method of the present invention.

DETAILED DESCRIPTION OF THE INVENTION

Although the method of the present invention may be adapted for use in all types of liquid phase separation units which employ a semi-permeable membrane barrier, it is particularly useful in processes employing reverse osmosis and electro-dialysis equipment in which the slightly soluble deposit-forming solutes are calcium fluoride, calcium carbonate, calcium sulfate, calcium phosphates, and silica. The latter three of these deposit-forming solutes are particularly a problem in processes for recovering purified water by concentrating brine. Thus, according to a preferred embodiment of the present invention, nucleation crystals are introduced into a stream of waste brine prior to its introduction into a reverse osmosis unit. The nucleation crystals cause preferential precipitation of calcium sulfate, calcium phosphates, and silica in the brine which may be removed as a concentrated slurry from the reverse osmosis unit. Optionally, the slurry may be further treated to obtain nucleation crystals for recycling to the waste brine feed.

While any material which preferentially attracts the particular deposit-forming solutes in the liquid stream may be used, it is preferred to employ the same material which is precipitating, as the nucleation crystals. In order to obtain optimum nucleation effect and insure that precipitation occurs preferentially on the nucleation crystals, the total surface area of nucleation crystals in the system should be controlled in proportion to the rate of precipitation of solutes in the system. This control may be accomplished in several ways. For example, if it is desired to increase the surface area of nucleation crystals, the average crystal size may be decreased by comminution or other means to increase the surface area of the crystals relative to their volume. Another method of increasing the total surface area of crystals is by increasing the total volume of the system while maintaining the concentration per unit volume of nucleation crystals constant. Still another way of increasing the total area of crystals in the system is by introducing an additional amount of crystals, either as fresh nucleation crystals or as recycled crystals from the recovered slurry.

Figure 1:
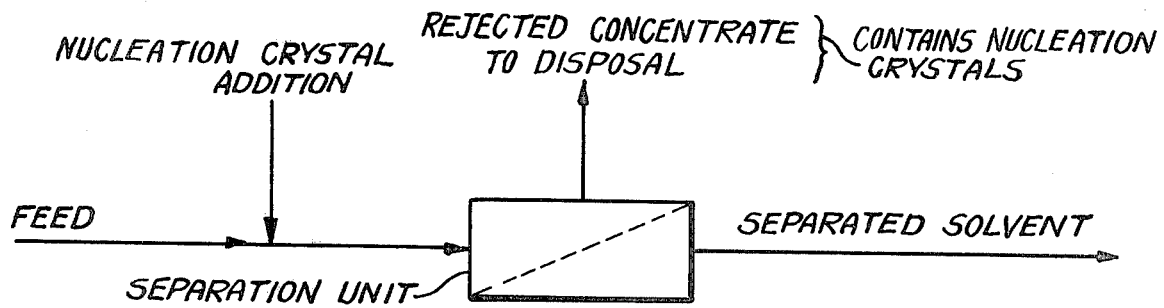
FIG. 1 shows a flow diagram for a single separation unit.
Figure 2:
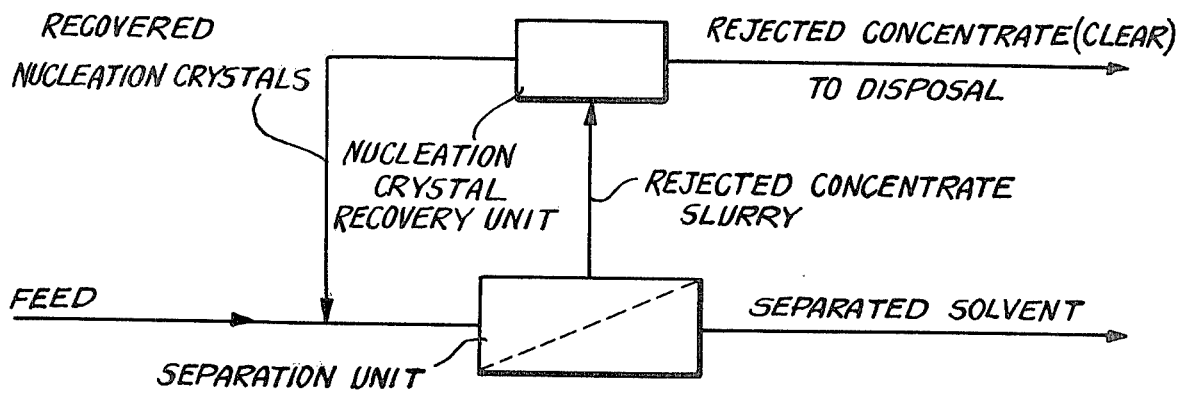
FIG. 2 illustrates a flow diagram for a single separation unit in combination with a recovery unit for separating the nucleation crystals from the rejected concentrated slurry from the separation unit.
Figure 3:
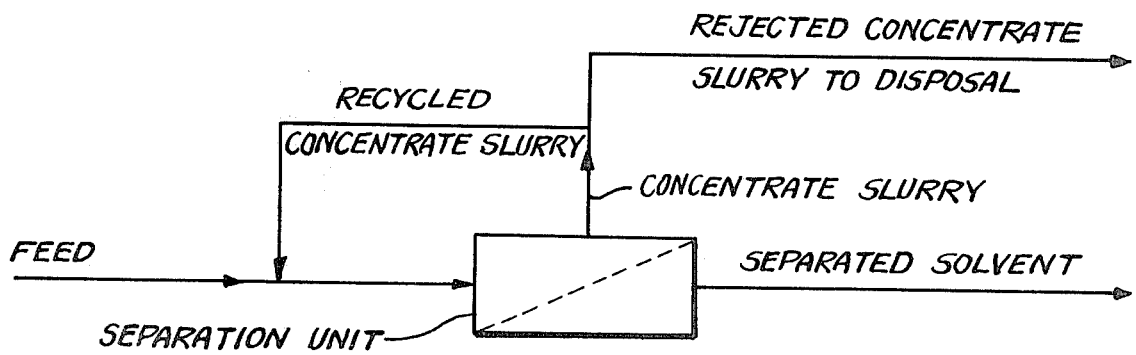
FIG. 3 shows a flow diagram for a separation unit with recycled slurry.
Figure 4:
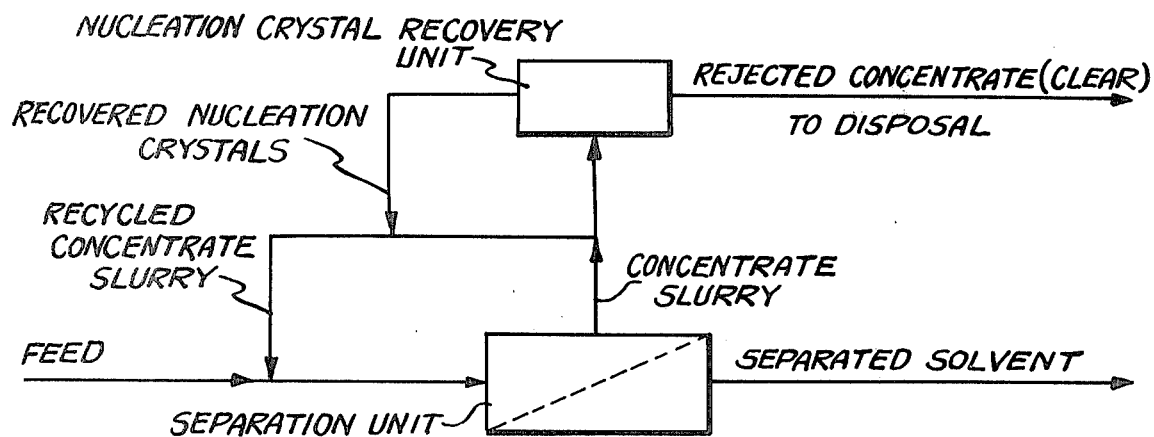
FIG. 4 illustrates a flow diagram for a system which combines the features of FIGS. 2 and 3 by placing a separation unit in combination with a feed recovery unit and recycled slurry stream.
Figure 5:
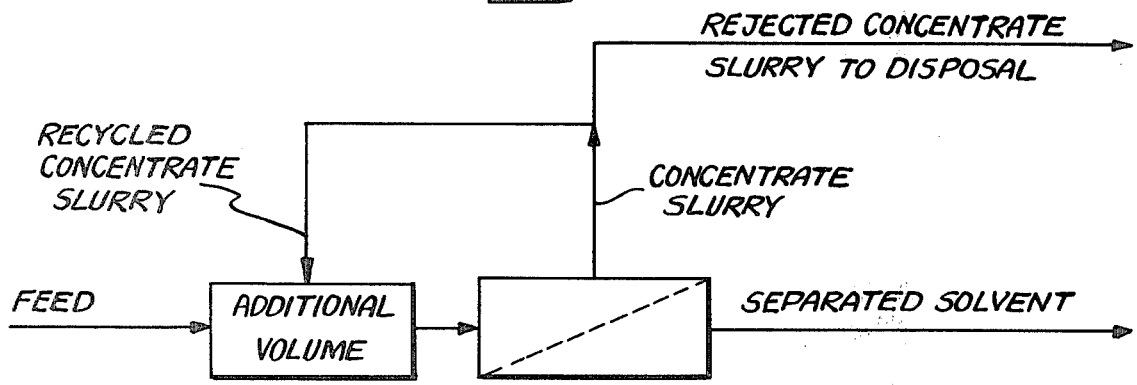
FIG. 5 shows a flow diagram for the separation unit with recycled slurry and a reservoir for providing additional residence volume for the recycled slurry; and, FIG. 6 shows a flow diagram for a system combining the features of FIGS. 2, 3, and 5, by using a crystal recovery unit in combination with a separation unit and recycled slurry stream in which a reservoir for providing additional residence volume is provided.
Figure 6:
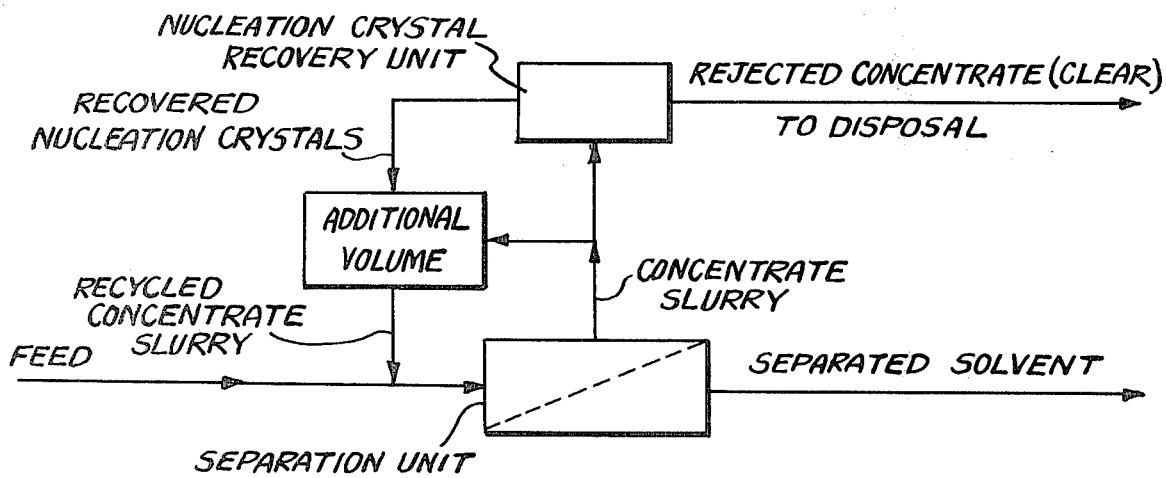

Reference to the figures of the drawing illustrates particular preferred embodiments of the present invention. The basic system is illustrated in FIG. 1. The liquid feed enters a separation unit after receiving a quantity of nucleation crystals. Purified solvent is recovered on the downstream side of the membrane in the separation unit. When brine comprises the liquid feed, purified water is the recovered solvent. The rejected slurry concentrate which contains the precipitated solute upon the nucleation crystals is removed from the upstream side of the membrane barrier in the separation unit. As illustrated in FIG. 2, the removed slurry concentrate can be further treated to separate nucleation crystals from the remainder of the slurry concentrate. The crystals may then be recycled into the feed stream. Alternately, the slurry concentrate recovered from the separation unit may be recycled, without additional treatment, to separate the nucleation crystals, as shown in FIG. 3, or, partially recycled as a slurry concentrate and partially as recovered crystals, as shown in FIG. 4. Finally, means can be included in the system to increase the residence volume of the recycled slurry concentrate or separated and recycled nucleation crystals, as shown in FIGS. 5 and 6, respectively. This additional volume, usually provided by a large tank or reservoir, serves a dual purpose by increasing residence time which allows additional precipitation to occur before the slurry concentrate is recycled back into the separation unit and by increasing the total surface area of the nucleation crystals relative to the system, thereby further insuring that precipitation of the deposit-forming solutes occurs on the nucleation crystals. Finally, it is preferred to include means to comminute the mass of precipitated solutes so as to obtain additional nucleation crystals for recycling back into the feed liquid. Any conventional means for comminuting crystals may be utilized and positioned anywhere between the outlet of the slurry concentrate and the liquid feed inlet.

In conducting the method of the present invention, the normal precautions for the operation of separation equipment should be observed, with the exception that saturation limits for the sparingly soluble solids, that is, calcium carbonate, calcium fluoride, calcium sulfate, calcium phosphates, and silica, may be exceeded. This is because the presence of the nucleation crystals will insure that when there is an excess of solute, precipitation on the nucleation crystals rather than deposition on the membrane barrier will occur. Thus, in practicing the process of the present invention, liquid feeds having solute concentrations greatly exceeding the saturation limit may be treated. Indeed, the only factor which limits the concentration of the solutes in the feed is the pressure requirements of the separation unit. Since an increase in solute concentration proportionally increases the pressure required to overcome the osmotic pressure and force the solvent through the semi-permeable membrane a point is eventually reached where the pressure requirements are so high that operation of the separation unit is not practical.

It is also desirable to include biocides in the feed stream to inhibit micro-biological growth and/or attack on the membrane barrier. This problem is particularly prevalent when the membrane is composed of organic material such as cellulose acetate.

Additionally, since a slurry of solids is being circulated throughout the system, normal handling precautions for slurries required to prevent settling of the solids and avoid dead or stagnant areas in the system must be observed. Depending upon the particular type of membrane barrier employed, it is often useful to adjust the hydrogen ion concentration of the liquid medium to insure optimum performance of the membrane barrier. In this regard, when a reverse osmosis unit is employed, pH levels of about 5.5 are preferred.

The apparatus of the present invention employs conventional liquid phase separation units which contain semi-permeable membrane barriers, such as, reverse osmosis and electro-dialysis units. The membranes contemplated for use in the apparatus of the present invention are also widely recognized by those of skill in the art. Particularly preferred are the cellulose acetate asymetric reverse osmosis membranes. Such membranes have been found to be particularly effective in purifying water from brine solutions.

The separation unit is connected to the system by means of conduits which serve as an inlet for the liquid feed containing the deposit-forming solutes and nucleation crystals, the latter having been added at a point upstream from the inlet to the separation unit. Outlet conduits are located on both the upstream and downstream sides of the membrane barrier in the separation unit. The downstream outlet emits purified solvent. The upstream outlet emits a concentrated slurry of precipitated solute and feed liquid which may be subsequently treated in a variety of ways, the purpose being to recover nucleation crystals for recycling to the feed. Thus, the slurry concentrate may be simply subjected to comminution to reduce the size of the precipitated solute to that of nucleation crystals before recycling. Alternately, the slurry may be subjected to slightly more sophisticated processing. For example, a nucleation crystal recovery unit may be positioned between the slurry concentrate outlet and the feed inlet to separate the precipitated solute from the concentrate. Typical of these units are centrifuges, hydroclone devices, gravity settlers and filters, although generally any liquid-solid separating device may be used. The recovered solute precipitate may then be comminuted and returned to the feed stream. Means for effecting comminution of the precipitate include high speed propelling devices, such as shear mixers, gear pumps, etc. As previously described, a tank or reservoir may also be placed at some point between the slurry concentrate outlet and the feed inlet in order to increase residence time and volume, which advantageously enhances precipitation of the deposit-forming solute.

As previously described, optimization of the method of the present invention is controlled by adjusting the ratio of nucleation crystal surface area to precipitation rate. Generally, depending upon the particular separation unit employed, this ratio must be greater than about $2.5 \times 10^6$ cm$^2$/gm/min., and preferably greater than about $5.0 \times 10^6$ cm$^2$/gm/min. This corresponds to a nucleation crystal size generally ranging from about 1 to 100 microns in length, and preferably having an average of about 10 microns in length. It has further been observed that in performing the process of the present invention with a liquid containing calcium sulfate, calcium phosphate and silica as the deposit-forming solutes, it is necessary to maintain the ratio of silica to calcium sulfate in the precipitated solid, below about 40% and preferably below about 20%, to insure that the silica will preferentially precipitate on the nucleation crystals and not the membrane barrier. For this same reason, the ratio of calcium phosphate to total precipitated solids should be maintained around about 10%. If the amount of silica and phosphate exceed these values, calcium chloride and sodium sulfate or other water soluble calcium and sulfate bearing compounds may be added as necessary to the feed to adjust the ratios downward.

In order to further illustrate the method of the present invention, the following example is provided, it being understood that its purpose is entirely illustrative and in no way intended to limit the scope of the invention.

EXAMPLE 1

Water having the composition shown in Table I was processed through a liquid phase separation system illustrated schematically by FIG. 5 which included a tubular reversed osmosis unit as the separation unit. It was observed that by maintaining the conditions in the system, listed in Table II, deposit formation on the membrane of the reverse osmosis unit was prevented:

TABLE I

COMPOSITION OF FEED USED IN TUBULAR REVERSE OSMOSIS

| COMPONENT | QUANTITY (as ion) |
| --- | --- |
| Sodium | 60 mg/l |
| Calcium | 529 |
| Magnesium | 275 |
| Chloride | 62 |
| Bicarbonate | 0 |
| Carbonate | 0 |
| Sulfate | 2,388 |
| Silica (as such) | 55 |
| TOTAL DISSOLVED SOLIDS | 3,374 |
| pH | 5.7 |

TABLE II

| | |
| --- | --- |
| System Mode: | FIG. 5 |
| Solids Precipitating: | Calcium sulfate and silica |
| Seed Crystal Size: | 10 micron average dia. (1 to 50 micron dia. range) |
| Seed Crystal Concentration: | 20,000 mg/l |
| Dissolved Solids Concentration | 20,000 mg/l |
| Precipitation Rate: | 230 mg/min. |
| Additional System Volume: | 60 liters |
| Pressure: | 300 p.s.i. |
| Feed Rate: | 49.4 gals/day |
| Separated Solvent Rate: | 45.3 gals/day |
| Rejected Concentration: | 4.1 gals/day |
| Ratio of Surface Area of Nucleation Crystals to Precipitation Rate: | $9.6 \times 10^6$ cm$^2$/gm/min. |

While the present invention has been described in terms of certain preferred embodiments, the skilled artisan will readily appreciate that various modifications, changes, omissions, and substitutions may be made without departing from the spirit thereof. Accordingly, it is intended that the scope of the present invention be limited solely by that of the following claims.

What is claimed is:

1. A method for preventing fouling in an apparatus used to separate a solvent from a deposit-forming solute which includes a semi-permeable membrane barrier, which comprises introducing an amount of nucleation crystals for said deposit-forming solute into the fluid stream passing to the separation apparatus, said amount being that which is effective to retard the formation of deposits on said semi-permeable membrane barrier by causing said deposit-forming solute to preferentially precipitate on said nucleation crystals rather than on said semi-permeable membrane barrier, wherein said nucleation crystals are comprised of at least one member selected from the group consisting of calcium fluoride, calcium carbonate, calcium sulfate, calcium phosphates and silica and wherein the ratio of nucleation crystal surface area to solute precipitation rate in said apparatus is maintained greater than about $2.5 \times 10^6$ cm$^2$/gm/min.

2. The method as defined by claim 1, wherein said separation apparatus is a reverse osmosis unit.

3. The method as defined by claim 1, wherein said separation apparatus is an electro-dialysis unit.

4. The method as defined by claim 1, wherein after passing through the separation apparatus, the nucleation crystals containing precipitated solute, are separated from the effluent emitted from the upstream side of the separation unit and recycled to the feed stream.

5. The method as defined by claim 4, wherein the nucleation crystals recovered from the effluent are comminuted before recycling to the feed stream.

6. The method as defined by claim 1, wherein the purified solvent is recovered from the downstream side of the membrane carrier.

7. The method as defined by claim 6, wherein said purified solvent is purified water.

8. The method as defined by claim 1, wherein the nucleation crystals are made of the same material as the solute.

9. The method as defined by claim 8, wherein said nucleation crystals are comprised of members selected from the group consisting of calcium sulfate, calcium phosphates, and silica.

10. The method as defined by claim 9, wherein the nucleation crystals have lengths ranging from about 1 to 100 microns.

11. The method as defined by claim 9, wherein the ratio of nucleation crystal surface area to solute precipitation rate is at least about $5.0 \times 10^6$ cm$^2$/gm/min.

12. In a method for recovering purified water from brine using an apparatus which includes a semi-permeable membrane barrier, the improvement comprising providing an amount of nucleation crystals in the brine which is sufficient to retard the formation of deposits on the membrane barrier, wherein said nucleation crystals are comprised of at least one member selected from the group consisting of calcium fluoride, calcium carbonate, calcium sulfate, calcium phosphates and silica and wherein the ratio of nucleation crystal surface area to solute precipitation rate in said apparatus is maintained greater than about $2.5 \times 10^6$ cm$^2$/gm/min.

13. An apparatus for separating a solvent from a solute comprising inlet means for introducing liquid feed, separation means including a semi-permeable membrane barrier, outlet means on both the upstream and downstream side of said semi-permeable membrane barrier for removing concentrated solute in the form of a slurry and purified solvent from said separation means, means for introducing an amount of nucleation crystals into said liquid feed, said amount being sufficient to retard the formation of deposits on the semi-permeable membrane barrier, and means for separating nucleation crystals from the slurry of concentrated solute removed from said separation means through the outlet means on the upstream side of said semi-permeable membrane barrier.

14. The apparatus as defined by claim 13, wherein said separation means is a reverse osmosis unit.

15. The apparatus as defined by claim 13, wherein said separation means is an electro-dialysis unit.

16. The apparatus as defined by claim 13, wherein said means for separating nucleation crystals from said slurry of concentrated solute comprises means for separating the precipitated solute from the slurry of concentrated solute and means for reducing the size of the precipitated solute thereby producing nucleation crystals.

17. The apparatus as defined by claim 16, further comprising means for recycling the nucleation crystals to said inlet means for introducing liquid feed.

18. The apparatus as defined by claim 17, further comprising a reservoir situated between said outlet means for removing said slurry of concentrated solute from said separation means and said inlet means for introducing liquid feed to said separation means.

* * * * *